(12) United States Patent
Takashima et al.

(10) Patent No.: US 6,409,158 B1
(45) Date of Patent: Jun. 25, 2002

(54) LIQUID-FILLED TYPE VIBRATION ABSORBING DEVICE

(75) Inventors: Yukio Takashima; Tsutomu Hashimoto, both of Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/705,358

(22) Filed: Nov. 3, 2000

(30) Foreign Application Priority Data

Jan. 27, 2000 (JP) .................................. 2000-018362

(51) Int. Cl.[7] .............................. B60K 5/12; F16F 13/08
(52) U.S. Cl. .................................. 267/140.13; 267/219
(58) Field of Search ........................... 267/140.13, 219, 267/220, 140.11, 140.14; 248/562, 636, 635

(56) References Cited

U.S. PATENT DOCUMENTS 5,183,243 A * 2/1993 Matsumoto ............ 267/140.13
5,240,233 A * 8/1993 Kato et al. .............. 267/140.13
6,170,811 B1 * 1/2001 Yotani et al. .......... 267/140.13

FOREIGN PATENT DOCUMENTS

JP  10-38015   2/1998
JP  10-47416   2/1998

* cited by examiner

Primary Examiner—Douglas C. Butler
(74) Attorney, Agent, or Firm—Jordan and Hamburg LLP

(57) ABSTRACT

A liquid-filled vibration absorbing device including a vibration absorbing base of rubber interposed between a holding cylinder of a lower mounting metal fixture and an upper mounting metal fixture. An annular member is fixed on the outer circumferential portion of the lower portion of the vibration absorbing base. A diaphragm is mounted on the lower end portion of an intermediate cylinder, and a partition member is mounted on the inner circumference of the intermediate cylinder. This intermediate cylinder is fitted at its upper portion in the cylindrical lower portion of the annular member and is fixed at the outer edge portion of its upper end on the flanged upper portion of the annular member, to form liquid chambers between the partition member, and the vibration absorbing base and the diaphragm and provide communication between the liquid chambers and through an orifice. The intermediate cylinder is press-fitted in the holding cylinder.

8 Claims, 6 Drawing Sheets

LIQUID-FILLED TYPE VIBRATION ABSORBING DEVICE

BACKGROUND OF THE INVENTION

1. Technical Field

The present invention relates mainly to a liquid-filled type vibration absorbing device to be used for bearing the power unit such as an automotive engine or another vibration generating body in a vibration absorbing manner.

2 Background of the Invention

As a vibration absorbing device for bearing a vibrating body such as a car engine in a manner to prevent the vibration from being transmitted to the car body, there have been known various proposals: a liquid-filled type vibration absorbing device which is constructed such that the inside of a body portion having a vibration absorbing base made of a rubbery elastic member is partitioned into two upper and lower chambers by arranging a partition member and a diaphragm which form a wall of the chambers, such that these two chambers are filled up with a liquid to become liquid chambers, and such that these two liquid chambers are caused to communicate with each other through an orifice formed in the outer circumference of the partition member, so that a vibration attenuating function and a vibration insulating function may be performed by the fluid flowing effect of the two liquid chambers and by the vibration absorbing effect of the vibration absorbing base.

In Japanese Patent Laid Open No. 38015/1998, for example, there has been proposed a liquid-filled type vibration absorbing device which is constructed such that there is fitted, in a bottomed cylindrical body metal fixture acting as a lower mounting metal fixture to be jointed to the lower portion of a vibration absorbing base, an intermediate cylinder which is equipped with a diaphragm at its lower end portion, which a partition member fits in around its inner circumference and which has an orifice formed in its outer circumferential portion by which the intermediate cylinder is fitted in, thereby to form two liquid chambers and one air chamber in the body metal fixture.

In the vibration absorbing device thus proposed, the upper mounting metal fixture mounted on the vibrating body protrudes upward from the vibration absorbing base, and the bracket on the vibrating body is jointed and fixed on the upper mounting metal fixture. As a result, the bracket extending from the vibrating body is enlarged and restricted in its possible mounting structure thereby to the detriment of the light weight and the mountability.

On the other hand, the stopper metal fixture for regulating the large displacement of the upper mounting metal fixture is fixed on the upper end portion of the main body metal fixture and is formed into a cylindrical shape enclosing the vibration absorbing base and the upper mounting metal fixture. This makes it necessary to fix the bracket over the upper mounting metal fixture, as described above, and impossible to mount a larger upper mounting metal fixture than that stopper metal fixture.

As the vibration absorbing device including the upper mounting metal fixture having a mounting hole perpendicular to the device axis, on the other hand, there has also been proposed (e.g., Japanese Patent Laid Open No. 47416/1998) a vibration absorbing device which can fasten the upper mounting metal fixture transversely to the bracket on the vibrating body by means of bolts.

In the case of this vibration absorbing device, the upper mounting metal fixture can be fastened transversely to the bracket on the vibrating body side by means of the bolts so that the bracket can be made compact. However, the stopper member for regulating the large displacements of the upper mounting metal fixture in the vertical and longitudinal directions is fastened by means of bolts and nuts with respect to the support portion extending to both the front and back sides from the lower end portion of the lower mounting metal fixture. Thus, the stopper member is troublesome to mount and is hard to adjust according to its mounting mode.

The invention has been conceived in view of the background thus far described and has an object to provide a liquid-filled type vibration absorbing device capable of easily coping with a complicated mounting mode or limited size on the vehicle with a small number of components and capable of being easily assembled while retaining the necessary strength and enhancing the durability and the reliability.

SUMMARY OF THE INVENTION

According to the invention, there is provided a liquid-filled type vibration absorbing device in which a vibration absorbing base made of a rubbery elastic member is interposed between a holding cylinder opened at top and bottom belonging to a lower mounting metal fixture and an upper mounting metal fixture of a thick cylindrical shape having an axis perpendicular to the axis of the device, and in which there are arranged in the holding cylinder a diaphragm made of a rubber film facing the vibration absorbing base and a partition member for partitioning the space between the vibration absorbing base and the diaphragm into two compartments, thereby to form two liquid chambers communicating with each other through an orifice, comprising: an annular member having a flanged upper portion and a cylindrical lower portion and fixed on the outer circumference of the lower portion of the vibration absorbing base; and an intermediate cylinder jointed to the annular member, wherein the diaphragm is attached to the lower end portion of the intermediate cylinder whereas the partition member is fitted in the inner circumference of the intermediate cylinder, wherein the intermediate cylinder is fitted at its upper portion in the cylindrical lower portion of the annular member and is caulked and fixed at the outer edge portion of its upper end on the flanged upper portion of the annular member, thereby to form the liquid chambers individually between the partition member and both the vibration absorbing base and the diaphragm and to cause the two liquid chambers to communicate with each other through the orifice formed in the partition member, and wherein the intermediate cylinder is press-fitted in the holding cylinder.

According to the invention, the liquid-filled type vibration absorbing device is tentatively assembled in the liquid layer into the state where liquid is sealed internally, by fitting the upper portion of the intermediate cylinder having the diaphragm and having a partition member fitted therein in the cylindrical lower portion of the annular member at the outer peripheral portion of the lower portion of the vibration absorbing base, and by caulking and fixing the outer edge portion of the upper end of the intermediate cylinder on the flanged upper portion of the annular member. After this, the liquid-filled type vibration absorbing device can be assembled in the air by press-fitting the intermediate cylinder downward in through the top of the holding cylinder of the lower mounting metal fixture. By this process, the vibration absorbing device can be easily assembled. Especially, the intermediate cylinder acts as the supporting portion of the diaphragm and as the fixing portion for jointing the outer circumferential wall of the liquid chamber and the annular member at the vibration absorbing base, so that the construction can be simplified to reduce the number of components.

The liquid-filled type vibration absorbing device can further comprise a bridge-shaped stopper member arranged over and around the upper mounting metal fixture fixed on the upper portion of the vibration absorbing base, restricting this metal fixture's large displacement, and the stopper member can be fixed at its two end portions by caulking a portion of the upper end edge of the holding cylinder of the lower mounting metal fixture. As a result, the stopper member can also be easily fixed while retaining a sufficient joint strength, to ensure the stopper action to suppress a large displacement.

The liquid-filled type vibration absorbing device is preferred to further comprise a stopper rubber integrated with the vibration absorbing base and attached to those portions of the upper portion and the side face of the upper mounting metal fixture, which correspond to the stopper member. Specifically, the upper mounting metal fixture can elastically abut against the stopper member through the stopper rubber thereby to prevent any hammering sound as might otherwise be caused by the abutment, to prevent noise.

The liquid-filled type vibration absorbing device can further comprise: a stopper portion extended from a portion of the flanged upper portion of the annular member for abutting against the upper mounting metal fixture when this metal fixture is much displaced downward, and the outer edge portion of the upper end of the intermediate cylinder can be caulked and fixed on the flanged upper portion of the annular member excepting the stopper portion. As a result, the intermediate cylinder can be caulked and fixed despite the presence of the stopper portion of the annular member.

In the liquid-filled type vibration absorbing device, the intermediate cylinder can include: an inner flange portion extended inward from the lower end portion of the intermediate cylinder and attaching the diaphragm to the inner circumference thereof; and a sealing rubber layer made integral with the diaphragm and attached to the inner circumference of the intermediate cylinder, and the partition member can be fitted liquid-tight by the sealing rubber layer at a position facing the inner flange portion. As a result, the two liquid chambers can be easily formed highly accurately in the intermediate cylinder, and the cover of the diaphragm can be omitted.

In the liquid-filled type vibration absorbing device, the partition member is preferably molded of a synthetic resin, aluminum or ceramics, and an orifice passage is formed in the outer circumferential portion of the partition member. As a result, the partition member can be easily fabricated, and the orifice for providing the communication between the two liquid chambers can be easily formed.

The partition member is preferred to have a plurality of through holes formed off center in the central plate portion thereof, and a rubbery movable valve is preferably disposed to confront the faces of the central plate portion for closing the through holes at the time of vibrations of a large amplitude. As a result, a high attenuation can be achieved at the time of vibrations of a large amplitude, and a low spring constant can be achieved at the time of vibrations of a small amplitude. Moreover, the space for forming the entrance/exit of the orifice can be retained without any problem.

The movable valve is preferred to include a pair of rubber plates so jointed to each other through the central plate portion of the partition member so as to come against the upper and lower faces of the central plate portion while leaving small clearances. The movable valve can be easily mounted, constructed and mounted.

DETAILED DESCRIPTION OF PREFERRED EMBODIMENT

A preferred embodiment of a liquid-filled type vibration absorbing device of the invention will be described with reference to the accompanying drawings, but the invention should not be limited thereto.

Figure 1:
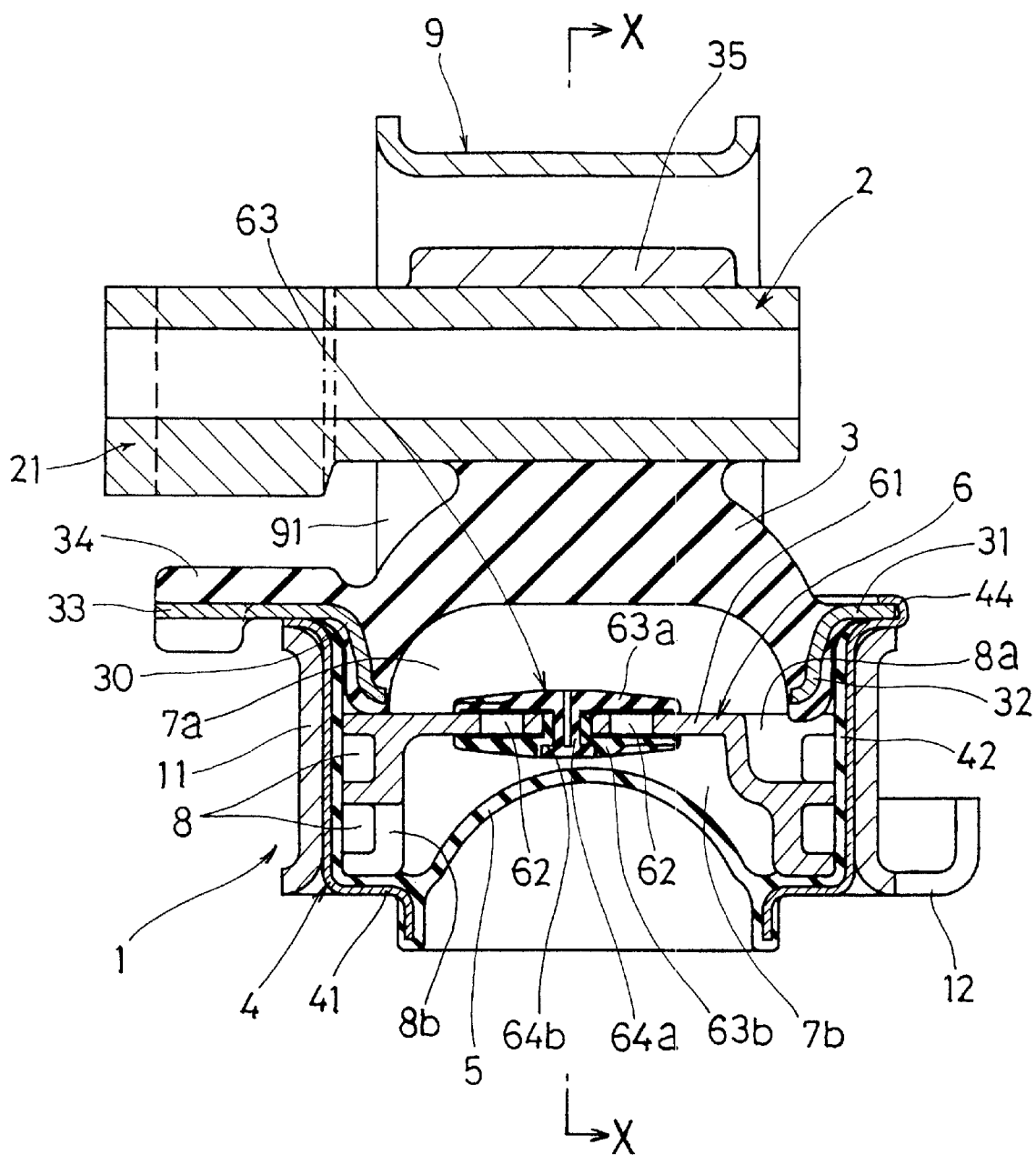
FIG. 1 is a longitudinal section of a liquid-filled type vibration absorbing device according to one embodiment of the invention.
Figure 2:
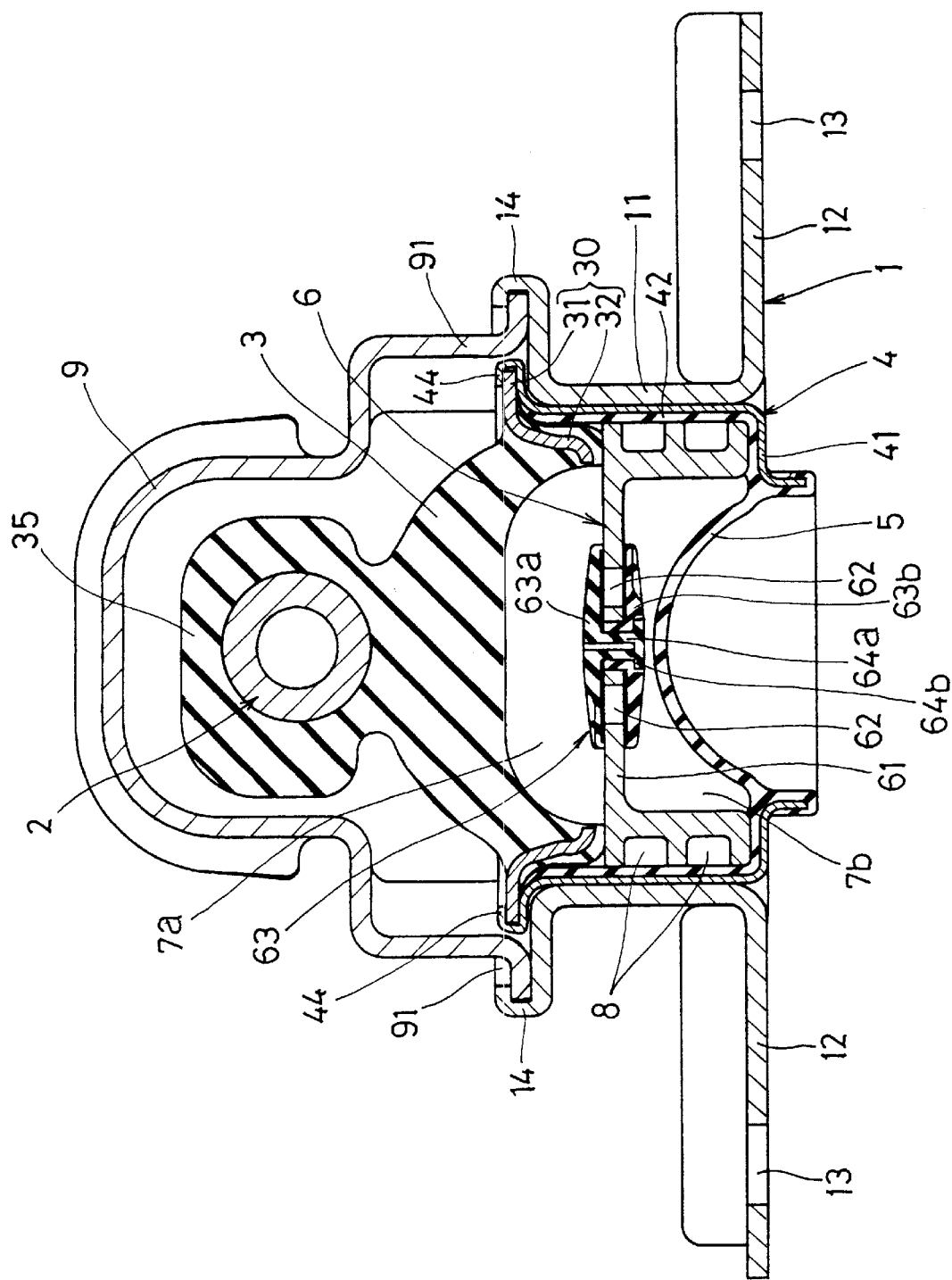
FIG. 2 is a longitudinal section taken along line X—X of FIG. 1.
Figure 3:
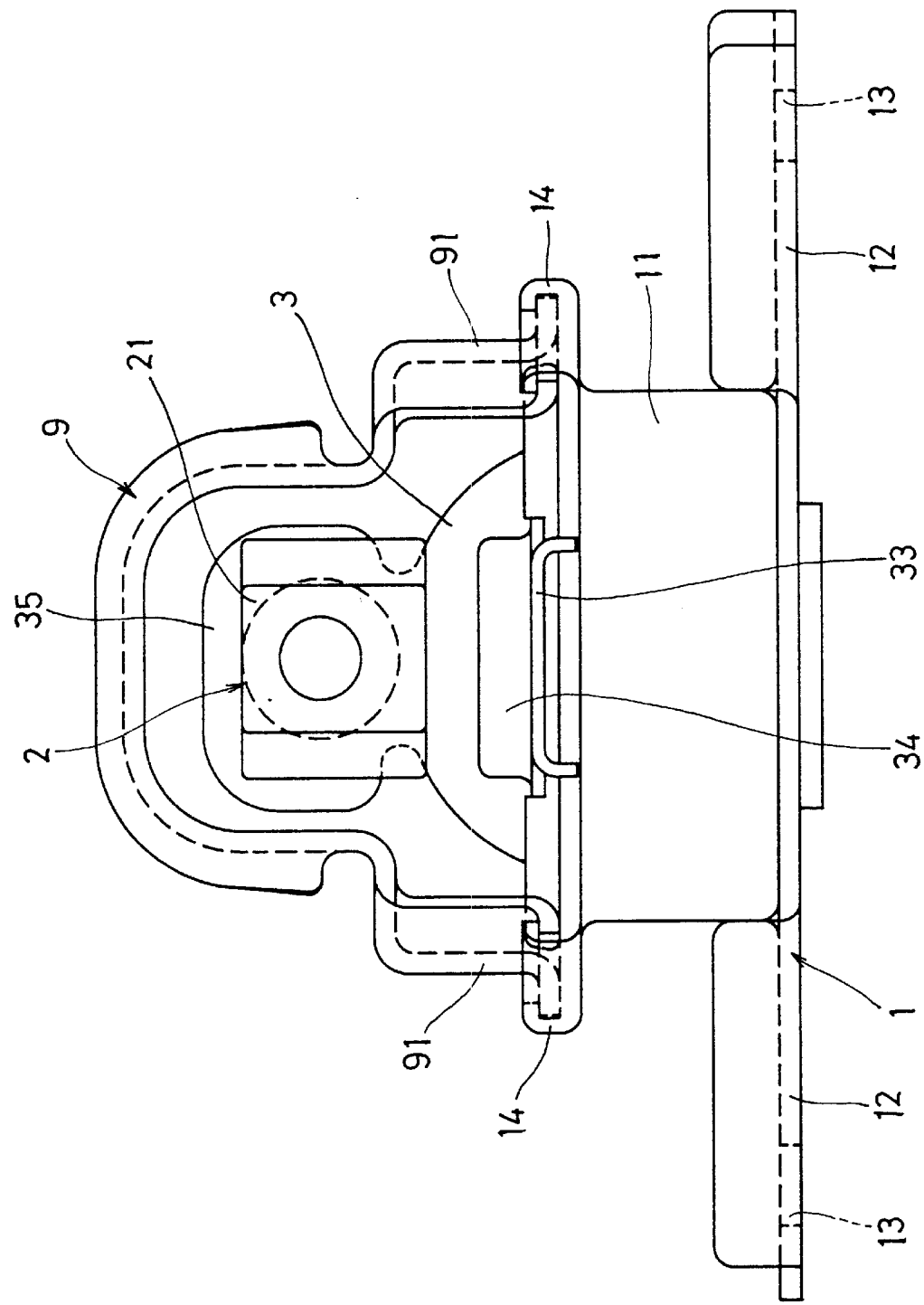
FIG. 3 is a front elevation of the same vibration absorbing device.
Figure 4:
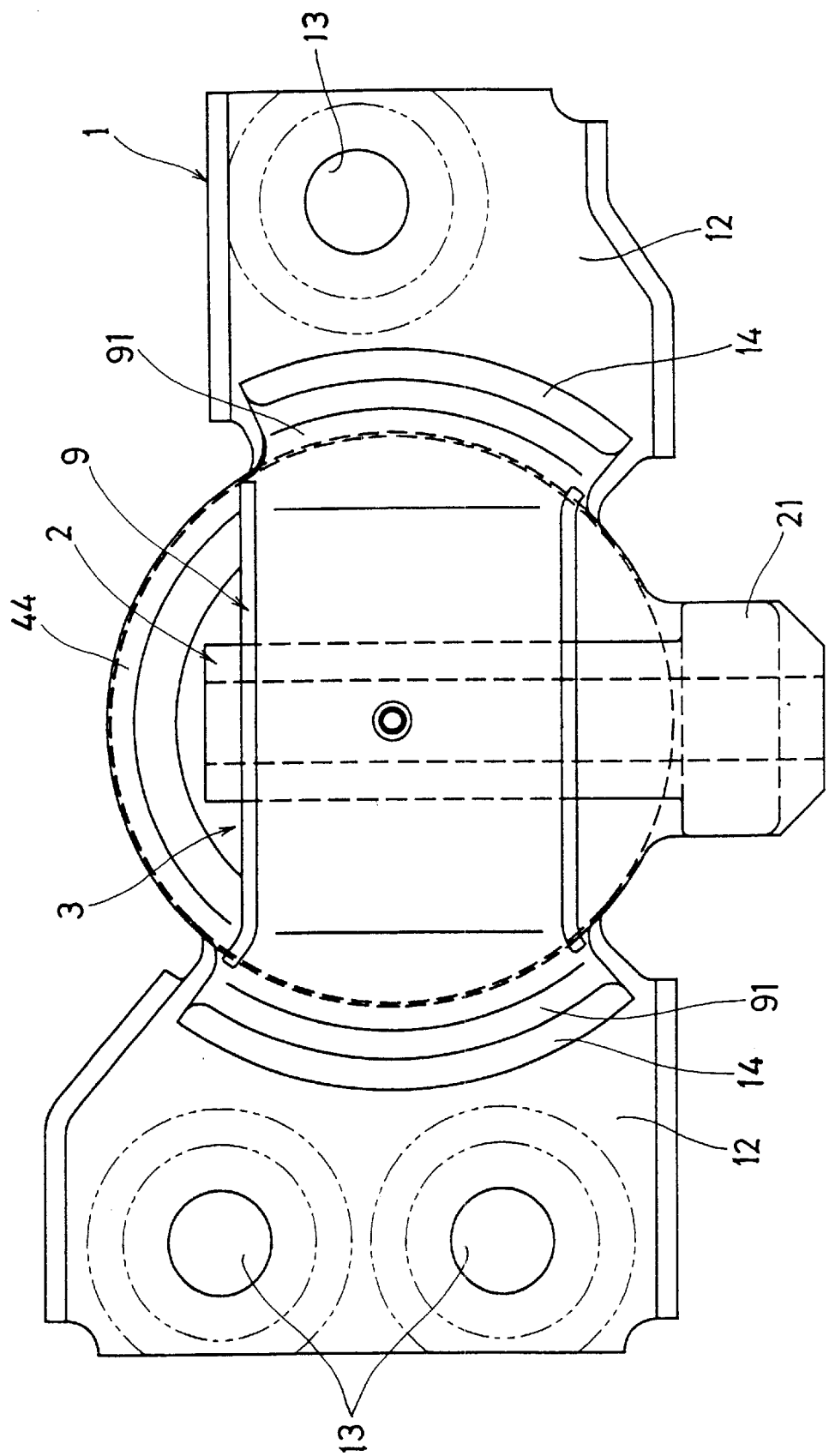
FIG. 4 is a top plan view of the same vibration absorbing device.
Figure 5:
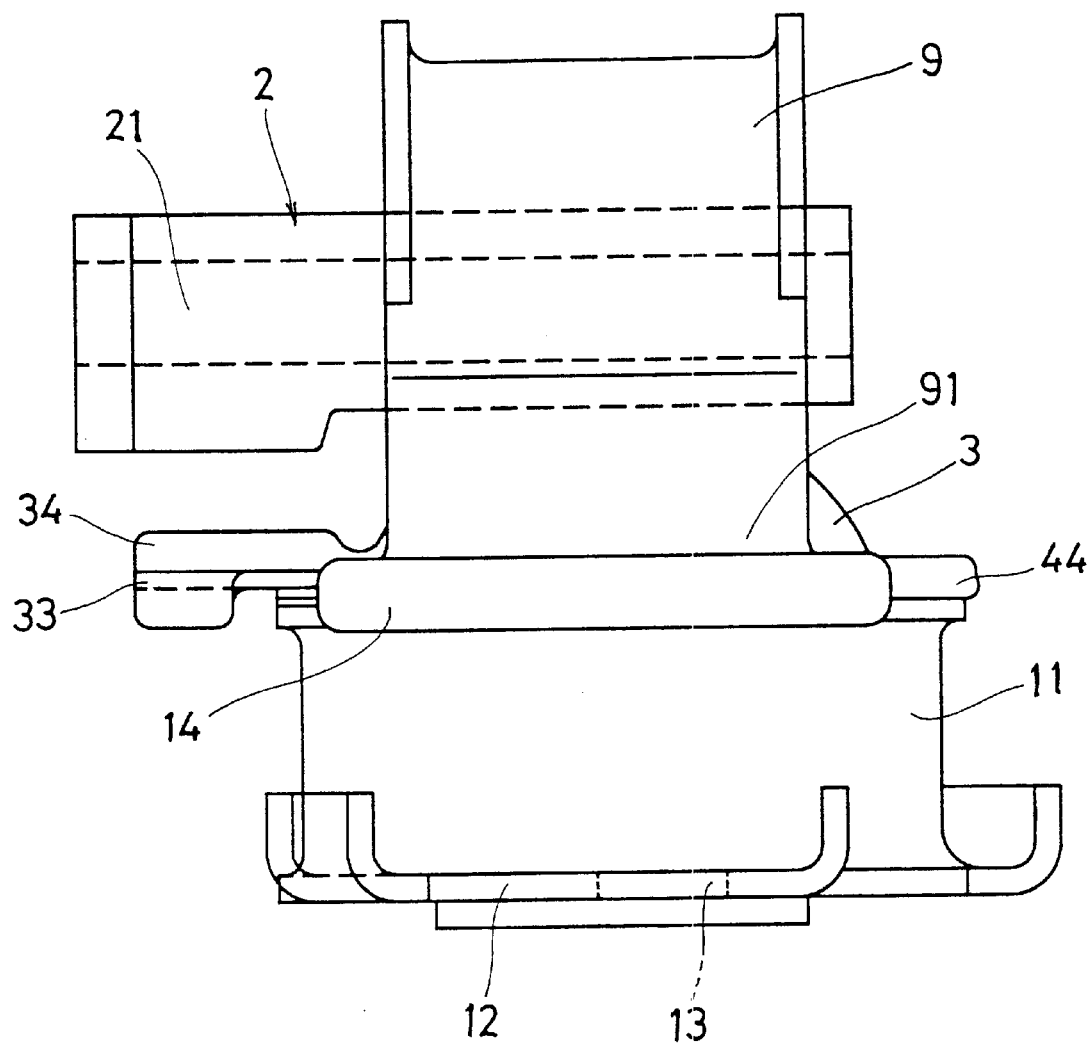
FIG. 5 is a side elevation of the same vibration absorbing device.
Figure 6:
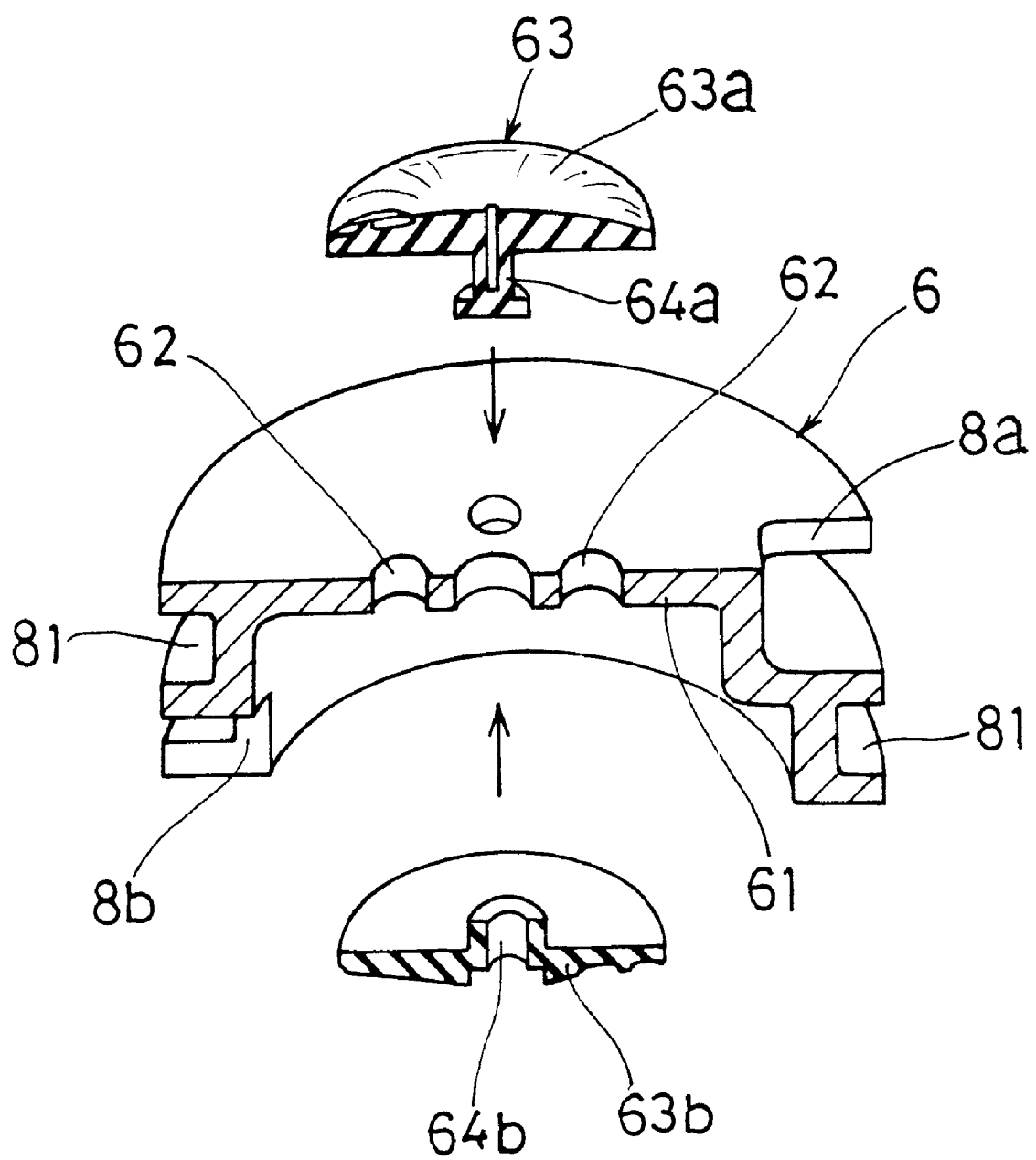
FIG. 6 is a partially sectioned perspective view showing a partition member separately.

In the liquid-filled type vibration absorbing device according to the embodiment of the invention, as shown in FIGS. 1 to 5: reference numeral (1) designates a lower mounting metal fixture equipped at its central portion with a holding cylinder (11) which is opened at the top and bottom; numeral (2) designates an upper mounting metal fixture having a thick, cylindrical shape and having an axis perpendicular to the device axis; and numeral (3) designates a thick vibration absorbing base made of a rubbery elastic material and interposed between the lower mounting metal fixture (1) and the upper mounting metal fixture (2).

The lower mounting metal fixture (1) is integrally drawn from a metallic material such as a steel sheet and is fastened mainly on the frame or bracket (although not shown) of a car body by bolt fastening means through supporting portions (12) and (12) protruding to the two sides from the lower end portion of the holding cylinder (11). Numeral (13) designates holes for bolt fastening. The supporting portions (12) and (12) are bent upward at its two side edges to form a generally concave cross section.

On the other hand, the upper mounting metal fixture (2) is protruded at its two end portions from the vibration absorbing base (3) and is mounted mainly on the (not-shown) bracket of the power unit, i.e., the vibrating body of an automotive engine by bolt fastening means inserting into the inner hole thereof. A protrusion (21) protruding long from one end of the upper mounting metal fixture (2) is formed into an angular shape for the later-described stopper action to provide a stopper face at its lower face.

The vibration absorbing base (3) is curved on its lower face side, as shown, and the upper mounting metal fixture (2) is so fixed in the upper portion of the vibration absorbing base (3) by vulcanizing means that its axis is horizontal. In the shown case, the vibration absorbing base (3) is held in a buried state by a stopper rubber which is integral therewith, as will be described hereinafter. On the other hand, the vibration absorbing base (3) is vulcanized in the outer circumference of its lower portion to adhere to an annular member (30) as a reinforcing metal fixture which is bulged outward at its upper portion into a flange shape and formed at its lower portion in a cylindrical shape to serve as a reinforcing metal fixture.

Numeral (31) designates a flanged upper portion of the annular member (30), and numeral (32) designates the cylindrical lower portion. At a portion of the flanged upper portion (31), there is integrally formed a stopper portion (33) which protrudes outward to a position corresponding to the one-end protrusion (21) of the upper mounting metal fixture (2), so that the lower face (facing the stopper) of the angular protrusion (21) can come, when the upper mounting metal fixture (2) is greatly displaced downward, against the stopper portion (33). On the upper face of this stopper portion (33), there is mounted a stopper rubber (34) which is made integral with the vibration absorbing base (3) so that it may receive the protrusion (21) elastically to cause no hammering sound.

Numeral (4) designates an intermediate cylinder which can be press-fitted in the holding cylinder (11) of the lower mounting metal fixture (1) to construct the outer circumferential wall of the liquid-filled body portion. This intermediate cylinder (4) is formed with top and bottom open. The intermediate cylinder (4) is equipped at its lower end portion with a diaphragm (5) which is made of a rubber film and facing the vibration absorbing base (3) to close the lower end opening, and is arranged with a partition member (6) between the vibration absorbing base (3) and the diaphragm (5). In the shown case, the intermediate cylinder (4) is equipped at its lower end portion with an inner flange portion (41) of a generally hook-shaped section, which is bent to extend inward. The diaphragm (5) is fixed on the inner circumference of the inner flanged portion (41) by vulcanizing means. On the inner circumference of the intermediate cylinder (4), there is mounted a sealing rubber layer (42) which is integrated with the diaphragm (5). Moreover, the partition member (6) is fitted liquid-tight in a position facing the inner flanged portion (41) through the sealing rubber layer (42).

The intermediate cylinder (4) is fitted liquid-tight at its upper portion in the cylindrical lower portion (32) of the annular member (30) at a position contacting the flanged upper portion (31), and the partition member (6) partitions two liquid-filled chambers (7a) and (7b) between itself and the vibration absorbing base (3) and between itself and the diaphragm (5). These two liquid chambers (7a) and (7b) are made to communicate with each other through an orifice (8) formed in the partition member (6).

The upper end portion of the intermediate cylinder (4) is formed into a flanged portion having a larger diameter than that of the flanged upper portion (31) of the annular member (30) and is folded back and caulked at its end edge portion (44) to fix the flanged upper portion (31) throughout the circumference excepting the stopper portion (33). As a result, the intermediate cylinder (4) acts as a fixing portion for the supporting portion of the diaphragm (5), the outer circumferential walls of the liquid chambers (7a) and (7b) and the portion fixing the position of the annular member (30) on the side of the vibration absorbing base (3).

The partition member (6) is molded of a synthetic resin having a necessary strength or rigidity, a metallic material such as aluminum, or a rigid material such as ceramics. In the outer circumferential portion of the partition member (6), there is formed a circumferential groove (81) for providing the orifice (8) extending in the circumferential direction. In the shown case, the circumferential groove (81) extends about two rounds communicating at one portion. However, the circumferential groove (81) can be modified in the length in the circumferential direction and in the cross sectional area perpendicular to the longitudinal direction suitably in accordance with the vibration absorbing characteristics and can also extend a half round or one and half rounds, for example. Numerals (8a) and (8b) designates the entrance/exit of the orifice (8), as opened into the two liquid chambers (7a) and (7b).

The partition member (6) is provided at its central plate portion (61) with a plurality of through holes (62) off center of the device axis. On the central plate portion (61), there is mounted a movable valve (63) of rubber, which can come into contact with both the upper and lower faces of the partition member (6), when vibrations occur with large amplitude (i.e., when the liquid chambers take a high pressure), to close the through holes (62). This movable valve (63) is composed of a pair of rubber plates (63a) and (63b), which are so jointed through the central plate portion (61) as to come against the upper and loser faces of the partition member (6) leaving extremely small clearances. In the shown case, the two rubber plates (63a) and (63b) are jointed to each other by fitting means including an attached mushroom-shape projection (64a) from one of the rubber plates (63a) and an engagement hole (64b) belonging to the other(63b). As a result, the movable valve (63) can be easily mounted. On the other hand, the vibration absorbing characteristics can be adjusted by adjusting the clearances between the rubber plates (63a) and (63b) and the central plate portion (61). For example, a high attenuation can be achieved at the time of vibrations of a large amplitude of 0.5 mm or more, and a low spring constant can be achieved at the time of vibrations of a small amplitude of 0.1 mm or less. The movable valve (63) thus made of rubber is disposed off center in the partition member (6) so that a space is retained for providing the entrance/exit (8a) and (8b) of the orifice (8).

With the intermediate cylinder (4) being thus jointed to the vibration absorbing base (3), moreover, the intermediate cylinder (4) is so press-fitted downward and assembled in the holding cylinder (11) that the protruding direction of the upper mounting metal fixture (2) intersects the projecting direction of the supporting portions (12) and (12) of the lower mounting metal fixture (1).

Over and around the upper mounting metal fixture (2) fixed on the upper portion of the vibration absorbing base (3), on the other hand, there is arranged an inversely recessed, bridge-shaped stopper member (9) for regulating the large displacement of the upper mounting metal fixture (2) in the upward direction and in the two forward and backward direction. The stopper member (9) is extended at its two end portions (91) and (91) downward and is caulked and fixed partially in the upper end edge of the holding cylinder (11) of the lower mounting metal fixture (1), so that it performs the stopper function for the upper mounting metal fixture (2) by abutment. Numeral (14) designates the caulked fixing portion.

To the upper portion and sides of the upper mounting metal fixture (2) facing the stopper member (9), there is attached a stopper rubber (35) which is integral with the vibration absorbing base (3). The upper mounting metal fixture (2) comes into elastic abutment against the stopper member (9) through the stopper rubber (35) so that the abutment can be prevented from causing the hammering sound.

In the shown embodiment, the stopper member (9) is bent at its two side edges so that it has a shallow "U" cross section to allow it to retain a predetermined strength.

The liquid-filled type vibration absorbing device thus constructed is assembled, as follows.

First of all, the paired rubber plates (63a) and (63b) composing the movable valve (63) are tentatively assembled on each side of the partition member (6). In the liquid bath, the partition member (6) which has the orifice (8) is then fitted in the inner circumference of the intermediate cylinder (4) which is equipped with the diaphragm (5). The intermediate cylinder (4) is fitted at its upper portion in the cylindrical lower portion (32) of the annular member (30) which is fixed on the circumferential portion of the lower portion of the vibration absorbing base (3), and the intermediate cylinder (4) is caulked at the outer edge portion of its upper end to fix the flanged upper portion (31) of the annular member (30), so that the components are tentatively assembled while filled with the liquid. In the air, the intermediate cylinder (4) is then press-fitted downward in the holding cylinder (11) of the lower mounting metal fixture (1) while being positioned such that the protruding direction of the upper mounting metal fixture (2) is perpendicular to the protruding direction of the supporting portions (12) and (12) of the lower mounting metal fixture (1). Next, the bridge-shaped stopper member (9) is placed over and around the upper mounting metal fixture (2) and is caulked and fixed at its two end portions (91) and (91) to part of the upper end edge of the holding cylinder (11).

At this time, the device can thus be easily assembled without requiring any positioning in the liquid bath, while retaining the sufficient liquid seal and the joint strength. On the other hand, the intermediate cylinder (4) acts both as the supporting portion for the diaphragm (5) and as the fixing portion for the outer circumferential wall of the liquid-filled body portion and the vibration absorbing base. As a result, the device can simplify the construction and lower the cost.

The liquid-filled type vibration absorbing device thus assembled and constructed is used in a cantilever joint by fixing the supporting portions (12) and (12) of the lower mounting metal fixture (1) on the frame or bracket of the car body or by fixing the upper mounting metal fixture (2) on the bracket of the vibrating body such as the power unit by the bolt fastening means. When the vibration absorbing base (3) is elastically deformed by the vibrations applied from the vibrating body, the liquid in the two liquid chambers (7a) and (7b) flows out/in through the orifice (8) so that the vibration attenuating effect can be obtained by the flowing effect of the orifice (8) and by the vibration absorbing effect of the vibration absorbing base (3).

According to the invention as has been described here, the liquid-filled type vibration absorbing device can easily cope with a complicated mounting mode or small size on the vehicle because of the small number of components and can be easily assembled while retaining the necessary strength and enhancing durability and reliability.

What is claimed is:

1. A liquid-filled type vibration absorbing device in which a vibration absorbing base made of a rubbery elastic member is interposed between a holding cylinder opened at top and bottom and part of a lower mounting metal fixture, and an upper mounting metal fixture of a thick cylindrical shape having an axis perpendicular to the axis of the device, and in which there are arranged in said holding cylinder a diaphragm made of a rubber film and directly facing the vibration absorbing base, and a partition member for partitioning the space between said vibration absorbing base and said diaphragm into two compartments, thereby to form two liquid chambers communicating with each other through an orifice, comprising:

an annular member having a flanged upper portion and a cylindrical lower portion and fixed on the outer circumference of the lower portion of said vibration absorbing base; and an intermediate cylinder joined to said annular member,
   wherein said diaphragm is attached to the lower end portion of said intermediate cylinder whereas the partition member is fitted in the inner circumference of the intermediate cylinder,
   wherein said intermediate cylinder is fitted at its upper portion in the cylindrical lower portion of said annular member and is caulked and fixed at the outer edge portion of its upper end to the flanged upper portion of said annular member, thereby to form the liquid chambers individually between said partition member and both said vibration absorbing base and said diaphragm and to cause the two liquid chambers to communicate with each other through the orifice formed in the partition member, and
   wherein said intermediate cylinder is press-fitted in said holding cylinder.

2. A liquid-filled type vibration absorbing device according to claim 1, further comprising:
   a bridge-shaped stopper member restricting large movement of said upper mounting metal fixture arranged over and across the upper mounting metal fixture fixed on the upper portion of the vibration absorbing base,
   wherein said stopper member is fixed at its two end portions by caulking and fixing to a portion of the upper end edge of the holding cylinder of said lower mounting metal fixture.

3. A liquid-filled type vibration absorbing device according to claim 2, further comprising:
   a stopper rubber integrated with the vibration absorbing base and attached to those portions of the upper portion and the side face of the upper mounting metal fixture, which correspond to the stopper member.

4. A liquid-filled type vibration absorbing device according to claim 1, further comprising:
   a stopper portion extended from a portion of the flanged upper portion of said annular member for abutting against the upper mounting metal fixture when this metal fixture is greatly displaced downward,
   wherein the outer edge portion of the upper end of said intermediate cylinder is caulked and fixed on the flanged upper portion of said annular member excepting said stopper portion.

5. A liquid-filled type vibration absorbing device according to claim 1,
   wherein said intermediate cylinder includes: an inner flange portion extended inward from the lower end portion of said intermediate cylinder and attaching said diaphragm to the inner circumference thereof; and a sealing rubber layer made integral with said diaphragm and attached to the inner circumference of said intermediate cylinder, and
   wherein said partition member is fitted liquid-tight by said sealing rubber layer at a position coming against said inner flange portion.

6. A liquid-filled type vibration absorbing device according to any of claims 1 to 5,
   wherein said partition member is molded of a synthetic resin, aluminum or ceramics, and
   wherein an orifice passage is formed in the outer circumferential portion of said partition member.

7. A liquid-filled type vibration absorbing device according to claim 6, further comprising:
   a plurality of through holes formed off center in the central plate portion of said partition member; and
   a rubbery movable valve disposed to come against the faces of said central plate portion for closing said through holes at the time of vibrations of a large amplitude.

8. A liquid-filled type vibration absorbing device according to claim 7,
   wherein said movable valve includes a pair of rubber plates so jointed to each other through the central plate portion of said partition member as to come against the upper and lower faces of said central plate portion while leaving small clearances.

* * * * *